United States Patent [19]
Beaman et al.

[11] Patent Number: 5,877,776
[45] Date of Patent: Mar. 2, 1999

[54] METHOD AND SYSTEM FOR SUPPORTING MULTIPLE FONT FORMATS BY A FONT SCALER SUB-SYSTEM

[75] Inventors: Alexander B. Beaman, Cupertino, Calif.; Michael R. Reed, Chapel Hill, N.C.

[73] Assignee: Apple Computer, Inc., Cupertino, Calif.

[21] Appl. No.: 638,490

[22] Filed: Apr. 26, 1996

[51] Int. Cl.[6] .................................................. G06F 19/00
[52] U.S. Cl. ............................................ 345/472; 707/542
[58] Field of Search .................................. 345/143, 467, 345/471, 472, 439, 128, 129, 130; 707/542

[56] References Cited

U.S. PATENT DOCUMENTS 5,533,174  7/1996  Flowers, Jr. et al. ................... 395/114
5,613,090  3/1997  Willems .................................. 395/500
5,671,341  9/1997  Kashiwazaki et al. ................. 395/112

FOREIGN PATENT DOCUMENTS 0658856  6/1995  European Pat. Off. ........ G06K 15/02

Primary Examiner—Mark K. Zimmerman
Attorney, Agent, or Firm—Sawyer & Associates

[57] ABSTRACT

A method and system for allowing scalers to support multiple font formats in a graphics system that processes data having a specified font format. The method and system includes actively registering each of the scalers with a font scaler manager by specifying a primary font format and one or more secondary font formats that are supported by each of the scalers. The font scaler manager then selects one of the scalers to process the data by finding a match between the specified font format and the primary font formats registered by the scalers. If a match is not found, then one of the scalers is selected by finding a match between the specified font format and the secondary font formats registered by the scalers.

30 Claims, 4 Drawing Sheets

METHOD AND SYSTEM FOR SUPPORTING MULTIPLE FONT FORMATS BY A FONT SCALER SUB-SYSTEM

CROSS-REFERENCE TO RELATED APPLICATIONS

The present application is related to application Ser. No. 08/638,489 entitled "A METHOD AND SYSTEM FOR PROVIDING MULTIPLE GLYPHS AT A TIME FROM A FONT SCALER SUB-SYSTEM," filed on the same date as the present application and assigned to the assignee of the present application.

FIELD OF THE INVENTION

The present invention generally relates to graphic output of text, and more particularly relates to typographic glyph construction of a user's input text within a computer system.

BACKGROUND OF THE INVENTION

Current computer systems provide individuals with opportunities to produce documents of professional quality, such as with desktop publishing software and graphics software programs. The ability to manipulate the appearance of the text within these programs is vital in allowing users greater flexibility and creativity in document production. Included in these manipulations are changes in fonts, justification, size, and other aspects of the appearance, such as bolding and italicizing.

Although most programs can perform manipulations with some level of success, each program has a limitation in its range of manipulations due to design considerations. Some programs, such as QuickDraw GX from Apple Computer, Cupertino, Calif., provide more sophistication and enhanced capabilities than other programs to allow more choices for users. Unfortunately, these enhanced capabilities are normally not transferable to other programs. Thus, attempts to incorporate such capabilities, such as different fonts, from one program into another are also usually quite limited and typically unsuccessful.

Accordingly, a need exists for a flexible and portable system that allows accurate and efficient manipulations of textual data in a graphics system. The present invention addresses such a need.

SUMMARY OF THE INVENTION

The present invention provides a method and system for allowing scalers to support multiple font formats in a graphics system that processes data having a specified font format. The method and system includes actively registering each of the scalers with a font scaler manager by specifying a primary font format and one or more secondary font formats that are supported by each of the scalers. The font scaler manager then selects one of the scalers to process the data by finding a match between the specified font format and the primary font formats registered by the scalers. If a match is not found, the one of the scalers is selected by finding a match between the specified font format and the secondary font formats registered by the scalers.

According to the present invention, scalers are provided with the ability to advertise that they support multiple font formats, and the font scaler sub-system is provided with a way to select the best scaler server to process data from among a group of scaler servers given a particular font format.

DETAILED DESCRIPTION

The present invention relates to typographic glyph construction in a computer system. For purposes of this discussion, typographic glyph construction refers to the formation of graphical representations displayed on a screen or output from the computer system based on the textual inputs and manipulations by a user, usually made via an input device, such as selection of keys on a keyboard. The following description is presented to enable one of ordinary skill in the art to make and use the invention and is provided in the context of a patent application and its requirements. Various modifications to the preferred embodiment and the generic principles and features described herein will be readily apparent to those skilled in the art.

In order to more fully describe the present invention, some definitions for the terminology used herein are now provided. Text refers to words of something written or printed. Within a line of text, are several runs of text. A run of text refers to text sharing a same style and/or encoding scheme within a line of text. An encoding scheme specifies the actual character code byte values for a given language and computer standard.

Characters are abstract objects having a single and unique semantic or phonetic meaning. Glyphs, as opposed to characters, represent the visual, graphical appearance of a character. The particular representation of a character by a glyph is done in the context of the font, the font being a collection of glyphs which typically have an element of design consistency in their appearance. In a preferred embodiment, the font contains a table that can map characters in one or more standard encoding schemes to glyph codes and those glyph codes have meaning within that font.

Within a given font, such as Geneva, Helvetica, Times, etc., aspects including serifs, stroke thickness, ligatures, and contextual forms have a degree of commonality. Serifs refer to fine lines in printing used for finishing off main strokes of a character, while ligatures refer to rendering forms that represent combinations of two or more characters, such as the combination of an "f" and an "i" into "fi" . Contextual forms are alternate appearances of a glyph whose use is dependent on certain contexts. Thus, the same character within a font may have different appearances, i.e., separate glyphs, each of which may have different contextual forms. For example, in Arabic, the same character can change appearance depending upon its position within a word.

Figure 1:
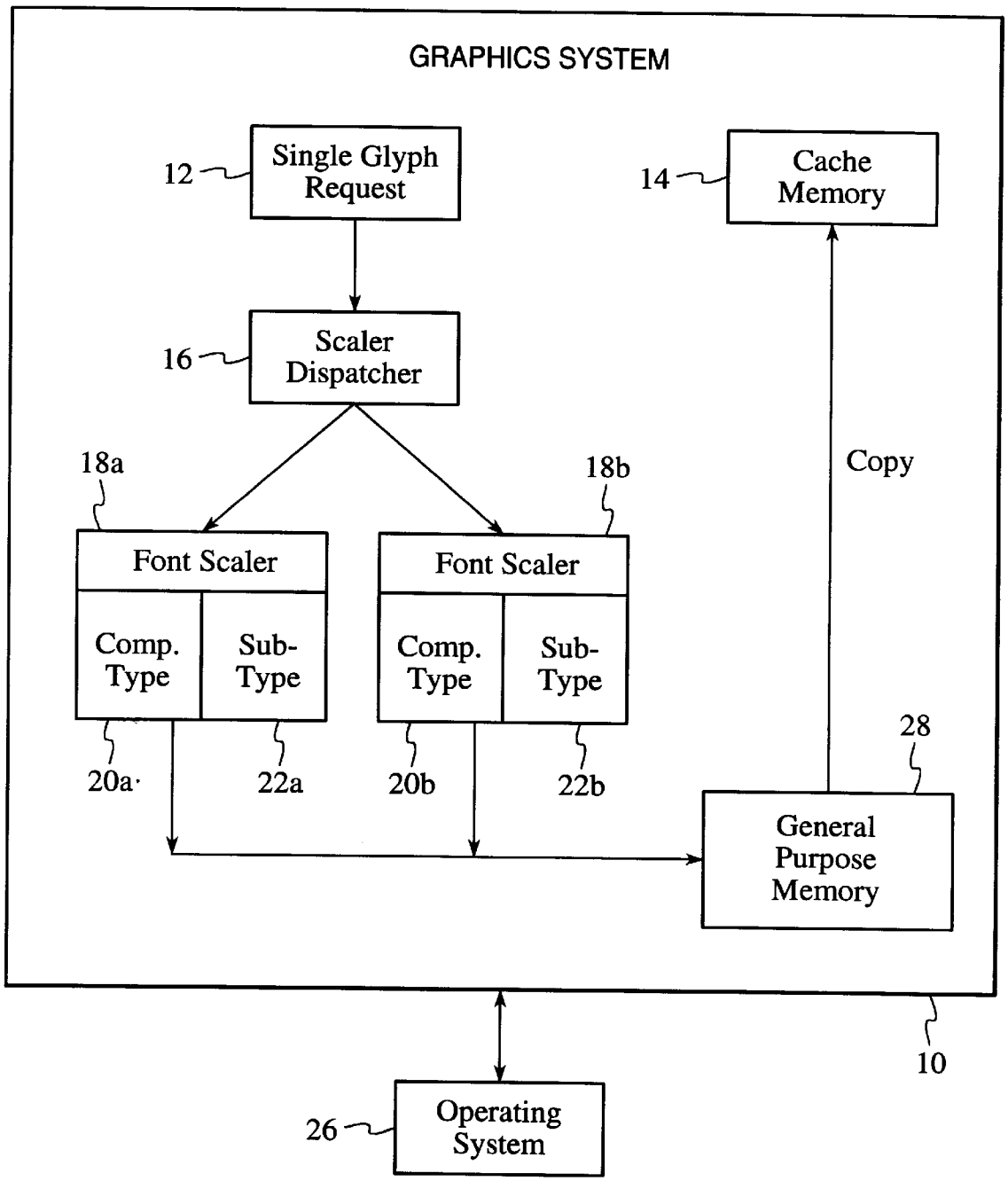
FIG. 1 is a block diagram illustrating components of a conventional graphics application.

FIG. 1 is a block diagram illustrating components of a conventional graphics system 10. The graphics system 10 enables the manipulation of graphics and text working in conjunction with an operating system 26, such as System 7 from Apple Computer, running on a computer system, such as an Apple Macintosh. To generate glyphs, the graphics system 10 utilizes a cache memory 14, a scaler dispatcher 16, one or more font scalers 18, and general purpose memory 28. The scaler dispatcher 16 provides a mechanism that permits support of multiple font file formats and provides an interface to the font scalers 18, which support the various font file formats. Each of the font scalers 18 support one font format and are used to compute the glyphs according to that format.

As a user inputs text, the graphics system 10 processes glyphs one at a time by forming a single glyph request 12 and then sending the glyph request to the scaler dispatcher 16. The scaler dispatcher 16 passes the request to the font scaler 18 where the glyph is then computed, stored in general purpose memory 28, and then copied into cache memory 14.

The request 12 may ask for a glyph rendering in the form of a bitmap or an outline, or the request 12 may ask only for glyph metric information. The request 12 includes a strike description that specifies the desired font, transformation and resolution information, and font variation information. From the font specification, the font format can be determined. The request 12 also specifies which glyph is desired using a two-byte glyph code.

Each font contains data organized into three classes of tables; public tables, public format layout tables, and font format-specific tables. Public tables are the minimum amount of data needed for the font and they provide character mapping information and the name of the font.

Public format layout tables are used for linguistic and stylistic manipulation. Public format layout table are not mandatory, but may be required by certain languages.

Font format-specific tables are usually proprietary and include a four-byte font format tag that indicates the type of proprietary font file format, which in turn, identifies which font scaler 18 should be used to generate the glyph data.

The font scalers 18, are implemented as separate components. The components are managed by component manager, such as operating system 26, or some type of kernel. Each component includes a component type tag that identifies it from other types of components.

As shown in FIG. 1, each font scaler 18 is assigned a component type tag 20, such as "SCLR," which identifies the component as a font scaler. Each font scaler 18 also includes a sub-type tag 22 that indicates which font file format that font scaler 18 supports. For example, if the font scaler 18a is capable of processing a True Type font, then the font scaler 18a may be assigned a sub-type 22a of "TRUE." And if font scaler 18b is capable of processing a Type I font, it may be assigned a sub-type 22b of "TYP1".

The type 20 and sub-type 22 tags for the font scalers 18 are maintained by the component manager. When the graphics system 10 is started, the scaler dispatcher 16 discovers what font scalers 18 are present (and therefore what font formats are supported) by querying the component manager. Thus, the scalers 18 are said to be passively registered with the scaler dispatcher 16. From the information gathered from the component manager, the scaler dispatcher 16 maintains a list of the font scaler sub-types 22.

When the scaler dispatcher 16 receives the glyph request 12, the scaler dispatcher 16 examines the font format tag in the request 12, and searches the font scaler list for the font scaler 18 that supports the indicated font by matching the font format tag with the font scaler sub-types. Once a match is found, the scaler dispatcher 16 dispatches the request to that font scaler for glyph generation.

Besides being inflexible and incapable of producing glyph renderings and font data for other graphics systems, glyph processing in a traditional graphics system 10 suffers several drawbacks. One drawback is that although the graphics system 10 supports multiple font file formats, each of the font scalers 18 supports only one type of font file format. Therefore, a separate font scaler 18 is required for every font file format supported by the graphics system 10, and a new font scaler 18 must be added to support a new font format.

Another drawback of the graphics system 10 is that the font services protocol is incapable of assigning a priority to one font scaler over another. If for some reason the graphics system 10 included two font scalers 18 that had matching sub-types, the scaler dispatcher 16 is incapable of determining which font scaler 18 can best service the request 12. Instead, the selection of the font scalers 18 is determined by the location of the two font scalers 18 in the scaler dispatcher's list. When the scaler dispatcher 16 searches the font scaler list for the font scaler 18 having a sub-type that matches the font format tag, the font scaler 18 selected to process the glyph data is the font scaler 18 that is found in the list first.

The present invention is a method and system for providing scalers with the ability to support multiple font formats. More particularly, the present invention is a method for selecting the best scaler to process data from a choice of several scalers, given that the data is in a particular font file format. To more fully describe one embodiment of the present invention, refer now to FIG. 2.

Figure 2:
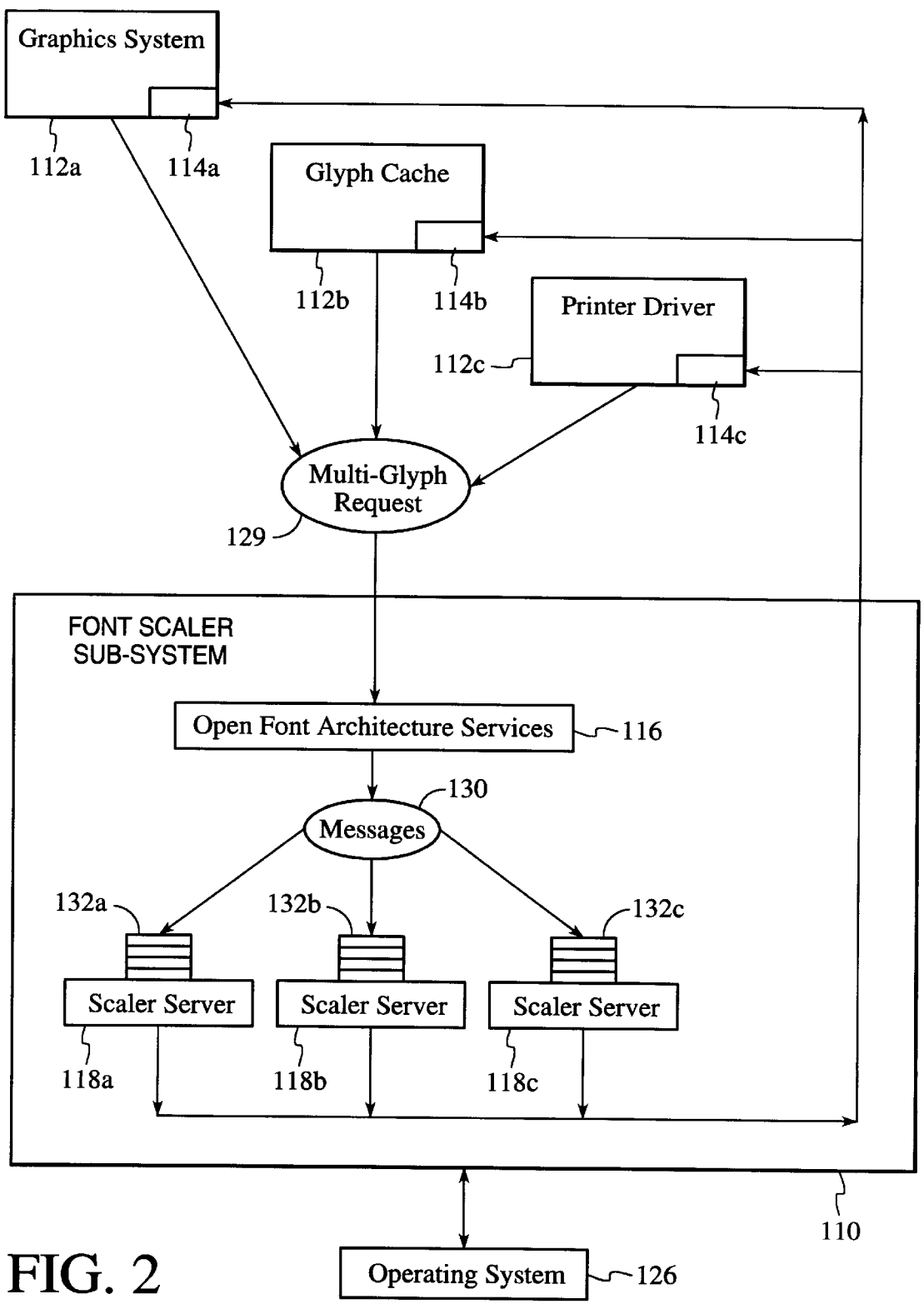
FIG. 2 is a block diagram illustrating components of a font scaler sub-system in a preferred embodiment of the present invention.

FIG. 2 is a block diagram illustrating components of a font scaler sub-system 110, which provides multiple glyphs at a time to various clients 112a, 112b and 112c (hereinafter client 112). As generally disclosed in copending application Ser. No. 08/638,489, entitled "A METHOD AND SYSTEM FOR PROVIDING MULTIPLE GLYPHS AT A TIME, FROM A FONT SCALER SUB-SYSTEM " which is herein incorporated by reference, the font scaler sub-system 110 includes an open font architecture services unit 116, and one or more scaler servers 118a, 118b and 118c.

The open font architecture services unit 116 (hereinafter OFA services unit 116) is an application program interface (API) that allows the clients 112 of the font scaler sub-system 10 to send multi-glyph requests 129 to the scaler servers 118 for glyph generation. Clients of the font scaler sub-system 110 may include a graphics system 112a such as QuickDraw GX, for example, and a printer driver 112c. The graphics system 112a may request that the glyphs be stored in graphics memory 114a, and the printer driver 112c may specify that the requested glyphs be transmitted to a buffer, where it will then be sent to the printer memory 114c.

Another example of a client of the font scaler sub-system 10 is a glyph cache 112b, which is a component of a glyph server (not shown). A glyph server is a portable unit that is capable of interfacing with a variety of graphics systems. Instead of generating glyph data themselves, a graphics system requests glyphs from the glyph server, which then services the request. The glyph cache 112b is used by the glyph server to store generated glyphs for high speed access. Thus, as a client of the font scaler sub-system 10, the glyph cache 112b may request that the glyph data items be stored in the memory 114B of the glyph cache 112b.

The scaler servers 118 are implemented as processes, rather than as static modules. Implementing the scaler servers 118 as processes enables the scaler servers 118 to communicate via transactions, which include a request message 130 and a corresponding reply.

The scaler servers 118 in the font scaler sub-system 110 are also capable of supporting multiple font formats. The scaler servers 118 communicate which fonts they support to the OFA services unit 116, which then decides which scaler server 118 is the best choice to process data, given the particular font format of the data.

In a preferred implementation, the OFA services unit 116 acts as the component manager for the scaler servers 118, although the operating system 126 can also perform this function.

Figure 3:
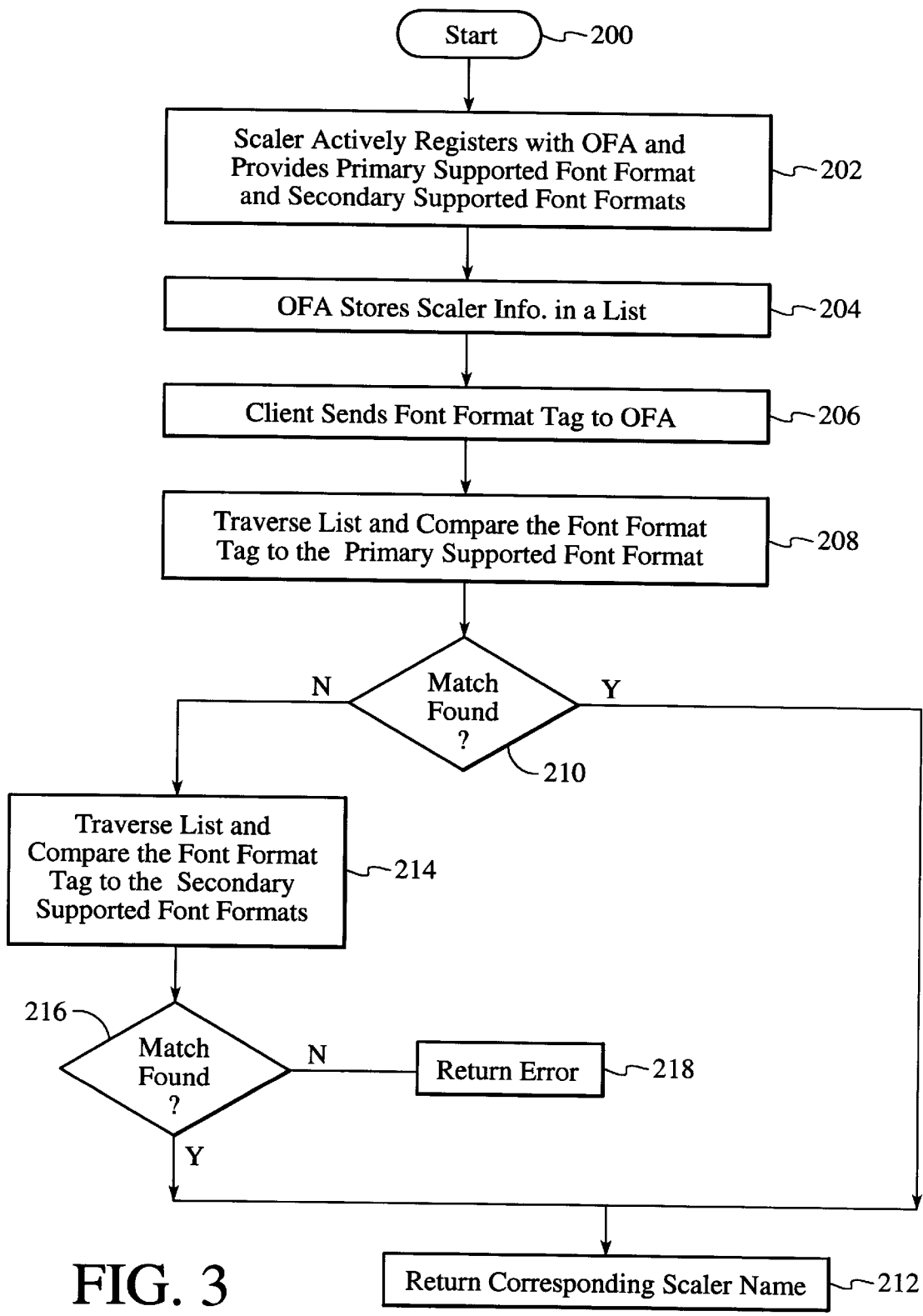
FIG. 3 is a flow chart illustrating the processing steps taken by the font scaler sub-system 110 to enable scaler servers 118 to support multiple font formats.

FIG. 3 is a flow chart illustrating the processing steps taken by the font scaler sub-system 110 to enable scaler servers 118 to support multiple font formats.

The process begins in step 200 when a scaler server 118 is initialized either during boot-up or when the scaler server 118 is added to the font scaler sub-system 110.

After initialization, the scaler server 118 actively registers itself with the OFA services unit in step 116. The purpose of this active registration, as opposed to passive registration, is to immediately inform the OFA services unit 116 of the scaler server's presence in the system 110 and to provide the OFA services unit 116 with information about the scaler server's pedigree and capabilities.

In a preferred embodiment, the scaler server 118 registers itself with the OFA services unit 116 by invoking an application program interface (API) function call, which is referred to here as OFA-REGISTER-SCALER. In a preferred embodiment the OFA-REGISTER-SCALER call includes the following parameters:

1. a scaler server name;
2. an array of font formats supported;
3. a list of functions supported (e.g., flattening fonts and kerning);
4. a list of metric types supported;
5. a list of renderings supported; and
6. a message object structure that enables the OFA services unit 116 to send messages to the scaler server 118.

Other parameters may also be included in the call, such as scaler server creator and version information, for example. In a preferred embodiment, the parameters are passed to the OFA service unit 116 as attribute groups.

The scaler server name is a unique four-byte tag identifying the scaler server 118, where the uniqueness of the tag may be limited to the graphics system 110.

The array of font formats supported is the parameter by which the scaler server 118 indicates its primary supported font and its secondary supported fonts. In a preferred embodiment, the array is a list of font format tags listed in descending order of aptitude, where the primary supported font is the first tag listed in the array, and the remaining tags in the list comprise the secondary supported fonts.

After the OFA services unit 116 receives the registration information from each scaler server 118, the OFA services unit stores the information as an entry in a scaler server list in step 204.

Figure 4:
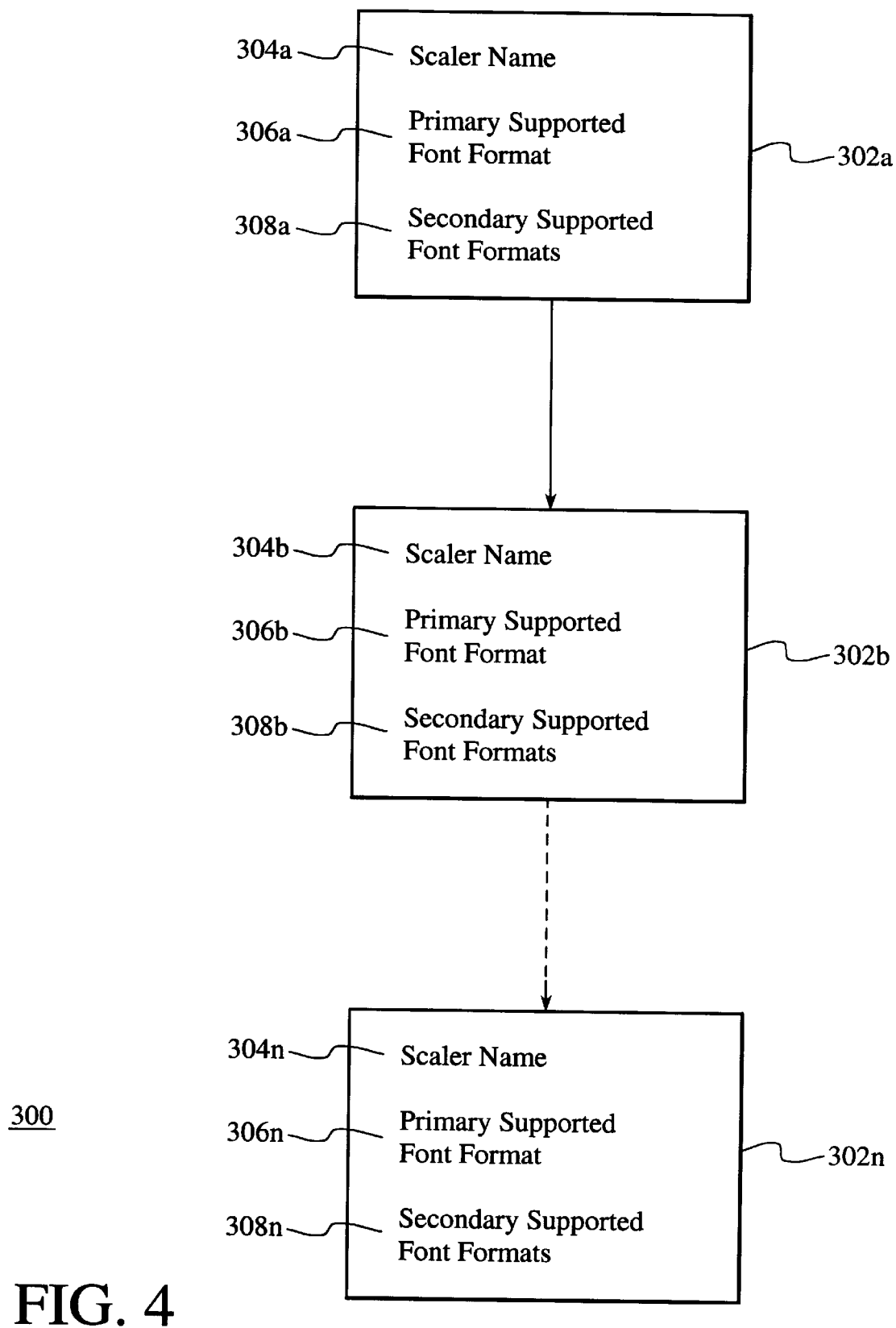
FIG. 4 is a block diagram graphically depicting a scaler server list 300, which includes an entry 302 for each scaler server present in the graphics system 110.

FIG. 4 is a block diagram graphically depicting a scaler server list 300, which includes an entry 302 for each scaler server present in the graphics system 110. Each entry includes the information passed to the OFA services unit 116 during registration, such as the tag for the scaler server name 304, the tag for the primary supported font 306 and the tags for the secondary supported fonts 308.

In a preferred embodiment, the scaler server list 300 is implemented as a linked list, where the last entry is placed at the beginning of the list, and each entry includes pointers (not shown) to the next entries in the list. As will be appreciated by one with ordinary skill in the art, the scaler server list 300 may be implemented using various other data structures.

Referring again to FIG. 2, when the client 112 is in need of glyph data, the client 12 requests the font scaler subsystem 110 to find the best scaler server 118 to generate the data in a given font, and to return that scaler server's name tag.

Referring again to both FIGS. 3 and 4, this is accomplished by the client 112 sending the font format tag associated with the glyph data to the OFA services unit 116 in step 206. In a preferred embodiment, the client 112 invokes an API call, referred to as OFA-FIND-SCALER, and passes the font format tag to the OFA services unit 116 as a parameter.

In response to the call and given the font format tag, the OFA services unit 116 selects a scaler server 118 to process the data by traversing the scaler server list 300, and comparing the font format tag to the primary supported font 306 in each entry 302 in step 208.

If a match is found in step 210, then the OFA services unit 116 returns the scaler server name 304 to the client 112 in step 212. If a match is not found, then the OFA services unit 116 traverses the scaler server list 300, and compares the font format tag to the listed secondary supported fonts 306 in each entry 302 in step 214. If a match is found in step 216, then the OFA services unit 116 returns the scaler server name 304 to the client 112 in step 212. If a match is not found, then the OFA services unit 116 returns an error to the client 112 in step 218.

The present invention enables the OFA services unit 116 to prioritize which scaler server 118 should perform a given job by using the primary supported font tag as a primary search key. Thus, although two or more scaler servers 118 may support the same font, only the scaler server 118 having that font listed as its primary supported font will be dispatched to generate the glyph data.

A font scaler sub-system 110 has been disclosed that provides scaler servers 118 with the ability to announce that they support multiple font formats, and a mechanism to select the best scaler server 118 from among a group of scaler servers 118 to process data having a particular format.

Software written according to the present invention is to be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for allowing scalers to support multiple font formats in a graphics system that processes data having a specified font format and for selecting the best scaler to process the data, the method comprising the steps of:

(a) actively registering each of the scalers with a font scaler manager by specifying a primary font format and one or more secondary font formats that are supported by each of the scalers;

(b) listing the primary supported font format and the secondary supported font formats in a prioritizing manner, where the primary supported font format has a higher priority;

(c) selecting one of the scalers to process the data by finding a match between the specified font format and the primary font formats registered by the scalers; and (d) if a match is not found, selecting one of the scalers to process the data by a match between the specified font format and the secondary font formats registered by the scalers.

2. A method as in claim 1 wherein step (a) further includes the step of:
  (a1) specifying a scaler server name.

3. A method as in claim 1 wherein the primary supported font format and the secondary supported font formats are listed in descending order of aptitude, where the primary supported font format is listed first.

4. A method as in claim 3 wherein step (a) further includes the step of:
  (a3) specifying a list of functions supported by the scaler server.

5. A method as in claim 2 wherein the component manager is an open font architecture (OFA) services unit.

6. A method as in claim 5 wherein step (a) further includes the step of:
  (a4) storing the primary supported font format, the secondary supported font formats, and the scaler name as an entry in a scaler list.

7. A method as in claim 6 wherein step (b) further includes the step of:
  (b1) receiving the specified font format from a client.

8. A method as in claim 7 wherein step (b) further includes the step of:
  (b2) traversing the scaler list and comparing the specified font format with the primary supported font in each entry.

9. A method as in claim 8 wherein step (b) further includes the step of:
  (b3) if a match is found, returning the corresponding scaler name from the entry to the client.

10. A method as in claim 9 wherein step (c) further includes the step of:
  (c1) traversing the scaler list and comparing the specified font format with the secondary supported font formats in each entry.

11. A method as in claim 10 wherein step (c) further includes the step of:
  (c2) if a match is found, returning the corresponding scaler name from the entry to the client.

12. A method as in claim 11 wherein step (c) further includes the step of:
  (c3) if a match is not found, returning an error to the client.

13. A method for allowing scalers to support multiple font formats in a graphics system that processes data having a specified font format and for selecting the best scaler to process the data, the method comprising the steps of:
  (a) actively registering a first scaler with a font scaler manager by specifying a scaler name, a primary font format and one or more secondary font formats supported by the scaler;
  (b) storing the primary supported font format, the secondary supported font formats, and the scaler name as an entry in a scaler list;
  (c) listing the primary supported font format and the secondary supported font formats in a prioritizing manner, where the primary supported font format has a higher priority;
  (d) receiving the specified font format from a client of the font scaler sub-system;
  (e) traversing the scaler list and comparing the specified font format with the primary supported font format in each entry;
  (f) returning the corresponding scaler name from the entry in the list to the client if a match is found;
  (g) traversing the scaler list and comparing the specified font format with the secondary supported font formats in each entry if a match is not found; and
  (h) returning the corresponding scaler name from the entry in the list to the client if a match is found.

14. A system for allowing scalers to support multiple font formats in a graphics system that processes data having a specified font format and for selecting the best scaler to process the data, the system comprising:
  a client for requesting the data;
  a font services unit in communication with the client for receiving the request, and for passing the request; and
  one or more scaler servers in communication with the font services unit for receiving the passed request and for generating glyph data, wherein each of the scaler servers registers with the font services unit by providing scaler information including a scaler name, a primary supported font format and one or more secondary supported font formats;
  wherein each of the scaler services lists the primary supported font format and the secondary supported font formats in a prioritizing manner, where the primary supported font format has a higher priority;
  wherein the font services unit selects one of the scalers to process the data by finding a match between the specified font format and the primary font formats registered by the scalers, and if a match is not found, the font services unit selects one of the scalers to process the data by finding a match between the specified font format and the secondary font formats registered by the scalers.

15. A system as in claim 14 wherein the font services unit further functions to store the scaler information as an entry in a scaler list.

16. A system as in claim 15 wherein each entry in the scaler list further includes a message object structure that enables the font services unit to send messages to the respective scaler server.

17. A system as in claim 16 wherein the primary supported font format and the secondary supported font formats are implemented as an array.

18. A system as in claim 17 wherein the primary supported font format and the secondary supported font formats are determined by the location occupied in the array.

19. A system for allowing scalers to support multiple font formats in a graphics system that processes data having a specified font format and for selecting the best scaler to process the data, the system comprising:
  means for actively registering a first scaler with a font scaler manager by specifying a scaler name, a primary font format and one or more secondary font formats supported by the scaler;
  means for storing the primary supported font format, the secondary supported font formats, and the scaler name as an entry in a scaler list;
  means for listing the primary supported font format and the secondary supported font formats in a prioritizing manner, where the primary supported font format has a higher priority;
  means for receiving the specified font format from a client of a font scaler subsystem;
  means for traversing the scaler list and comparing the specified font format with the primary supported font in each entry, and returning the corresponding scaler name from the entry in the list to the client if a match is found; and means for traversing the scaler list and comparing the specified font format with the secondary supported font formats in each entry if a match is not found, and means for returning the corresponding scaler name from the entry in the list to the client if a match is found.

20. A computer-readable medium containing program instructions for allowing scalers to support multiple font formats in a graphics system that processes data having a specified font format and for selecting the best scaler to process the data, the program instructions comprising:

(a) instructions for actively registering each of the scalers with a font scaler manager by specifying a primary font format and one or more secondary font formats that are supported by each of the scalers;

(b) instructions for listing the primary supported font format and the secondary supported font formats in a prioritizing manner, where the primary supported font format has a higher priority:

(c) instructions for selecting one of the scalers to process the data by finding a match between the specified font format and the primary font formats registered by the scalers; and (d) if a match is not found, instructions for selecting one of the scalers to process the data by a match between the specified font format and the secondary font formats registered by the scalers.

21. A computer-readable medium as in claim 20 wherein instruction (a) further includes instructions for:

(a1) specifying a scaler server name.

22. A computer-readable medium as in claim 21 wherein instruction (a) further includes instructions for:

(a3) specifying a list of functions supported by the scaler server.

23. A computer-readable medium as in claim 21 wherein the component manager is an open font architecture (OFA) services unit.

24. A computer-readable medium as in claim 23 wherein instruction (a) further includes instructions for:

(a4) storing the primary supported font format the secondary supported font formats, and the scaler name as an entry in a scaler list.

25. A computer-readable medium as in claim 24 wherein instruction (b) further includes instructions for:

(b1) receiving the specified font format from a client.

26. A computer-readable medium as in claim 25 wherein instruction (b) further includes instructions for:

(b2) traversing the scaler list and comparing the specified font format with the primary supported font format in each entry.

27. A computer-readable medium as in claim 26 wherein instruction (b) further includes instructions for:

(b3) if a match is found, returning the corresponding scaler name from the entry to the client.

28. A computer-readable medium as in claim 27 wherein instruction (c) further includes instructions for:

(c1) traversing the scaler list and comparing the specified font format with the secondary supported font formats in each entry.

29. A computer-readable medium as in claim 28 wherein instruction (c) further includes instructions for:

(c2) returning the corresponding scaler name from the entry to the client if a match is found.

30. A computer-readable medium as in claim 29 wherein instruction (c) further includes instructions for:

(c3) returning an error to the client if a match is not found.

* * * * *